United States Patent Office 3,336,193
Patented Aug. 15, 1967

3,336,193
ANALGESIC COMPOSITION AND METHOD EMPLOYING ASPIRIN AND GELSEMINE
Jean Valery, Paris, and Jean Laville, Boulogne, France, assignors to Societe Boulonnaise de Recherches et de Diffusion Pharmaceutiques "Sobore" Societe Anonyme, Boulogne-sur-Seine, Seine, France, a corporation of France
No Drawing. Filed Oct. 31, 1963, Ser. No. 320,558
Claims priority, application France, Nov. 5, 1962, 914,341
2 Claims. (Cl. 167—65)

The present invention relates to a novel analgesic composition comprising the association of two active principles, aspirin and gelsemine.

Aspirin (acetylsalicylic acid) is a well-known chemical component, the developed formula of which is:

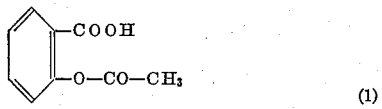

(1)

Gelsemine is the alkaloid of the gelsemium seppervirens of the order of the Loganiacae; the X-ray analysis of gelsemine has been made by F. M. Lovell, R. Pepinsky, A. J. C. Wilson ("Tetrahedron Letters" 1959, No. 4, page 1):

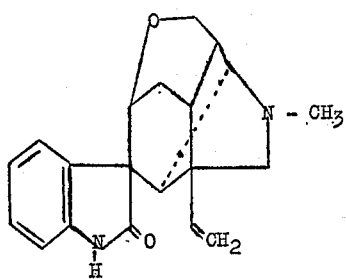

The empirical formula of gelsemine is:

$$C_{20}H_{22}O_2N_2$$

and in the pure state it yields white crystals melting at a temperature of 175° C.

$$[\alpha]_D^{20} = +15° \text{ (chloroform)}$$

It is known, on the other hand, that aspirin is a medicament highly used in human therapeutics as an analgesic in influenza, rheumatism, etc.

The applicant has carried out a very precise pharmacological investigation of the specially purified gelsemine, having a structure according to Formula 2. This study has shown that for a dose near 1 mg. per kilo of body weight of the animal, the analgesic effect of gelsemine appears between the fifteenth and the thirtieth minute after being administered, passes through a maximum between the second and fourth hour and extends into the sixth hour.

Simultaneously, the applicant has established that the analgesic dose of aspirin is in the neighbourhood of 500 mg. per kilo of body weight. At this dose, the experimental analgesis with the animal begins rapidly, passes through a maximum in the first hour, then fades away and becomes nearly null after a period of two hours.

Having thus established the importance of the difference of delay in the analgesic action of aspirin and gelsemine, it occurred to the applicant to associate these two active principles in order to obtain a medicament with a rapid, but extended analgesic action.

From the experimental investigation effected by the applicant on the gelsemine-aspirin association, it results that this novel association, object of the present invention, ensures an analgesic action starting from about the fifteenth minute after its administration and extending up to at least the eighth hour thereafter.

Moreover, the intensity of the analgesic action of the novel association as proposed by the applicant does not result only from a simple addition of the analgesic effects pertaining respectively to each of the two active principals, taken separately, but a marked potentialized common effect occurs in such a manner that the novel aspirin-gelsemine association will assure a fast, intense, continuous and durable analgesia.

The applicant has also effected a pharmacological study of pure gelsemine of Formula 2 in order to determine the mean lethal dose (acute toxic value) $DL_{50}$ of the mouse.

The following values have been found:

| | Mg./kg. |
|---|---|
| Orally | 1240 |
| Intraperitoneal injection | 405 |
| Intravenous injection | 133 |

The analgesic dose of the gelsemine alone is thus 500 to 1000 times lower than the $DL_{50}$-value.

Besides, the applicant has shown that gelsemine possesses the following pharmacological properties:

it is neither curariform, nor ganglioplegic or sedative of the central nervous system,
it has a marked antiserotonine action,
it reinforces the hypertensive action of adrenaline,
it is a hypotensor at a high dose,
it has no effect on the heart,
it does not potentialize the action of barbituric products.

Therefore, used at the analgesic dose of 1 mg./kg., gelsemine presents no undesirable marked pharmacological action.

The novel gelsemine-aspirin association was experimented on 25 subjects suffering from various ailments (acute or chronic rheumatism, post-traumatic pain, hemiplegic pain etc.).

At the start of the clinical tests a posology of 3 tablets a day, corresponding to 1.20 g. of aspirin (acetylsalicylic acid) and 1.5 mg. gelsemine was administered. On account of the satisfactory tolerance to this product, the doses could be increased so as to attain 6 tablets per day, i.e. 2.40 g. of acetylsalicylic acid and 3 mg. of gelsemine. Besides, the antalgic activity of the gelsemine-aspirin was compared to that of aspirin at the same does and to that of a placebo composition.

Among the 25 patients treated, 17 were markedly improved by the gelsemine-aspirin association. From the 25 patients considered, 5 were improved by an equivalent dose of acetylsalicylic acid and a single one by the placebo.

The result of the clinical tests mentioned hereinabove show that the gelsemine-aspirin association possesses an undeniable anti-algic action, highly superior to that of acetylsalicylic acid, and forms a fast working, powerful and durable analgesic. The action of the medicament is particularly conclusive in the case of facial, cervical and dental pains affecting the trigeminal nerve zone. The novel pharmaceutical composition is also beneficial in cases of influenza, migraine, chronic ailments such as arthralgic ailments of the rheumatic type.

The clinical tests have also shown that the novel composition presents no toxic properties. In case of an extended treatment and high doses of administration (such as 2.40 g. of aspirin and 3 mg. of gelsenium per day), only slight gastric intolerance was noted, which are moreover present, in a general way, in any type of salicylate medicament, and which may be easily guarded against.

Therefore, the following formulations may be adopted, without any major inconvenience, for the gelsemine-aspirin association, object of the present invention:

|  | Mg. |
|---|---|
| Aspirin | 300 to 500 |
| Gelsemine, per dose | 0.5 to 2 |

The alalgesic medicament resulting from the aspirin-gelsemine association, in the proportions mentioned above, represents a medicinal weighted dose and may be presented in tablets, suppositories, beads, capsules or gels, cachets, solutions, suspensions in buffer or anti-acid substances, with non toxic excipients of current use.

From the posological point of view, the medicament presented in any of the forms mentioned at the doses indicated (300 to 500 mg. of aspirin and 0.5 to 2 mg. of gelsemine per dose) may be administered daily orally, parenterally or anally conduct, either as a single dose, or at the rate of two to five doses spaced over the day, according to the acuity of the pain.

What we claim is:
1. An algesic composition comprising a mixture of 250 to 500 mg. of aspirin and 0.3 to 2.00 mg. of gelsemine having the formula

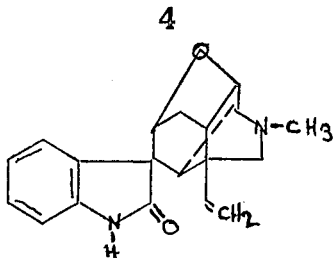

2. A method of relieving pain in humans rapidly and for prolonged periods which comprises administering to humans an effective amount of a mixture of 250 to 500 mg. of aspirin and 0.3 to 2.00 mg. of gelsemine having the formula

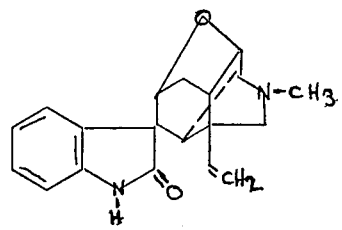

References Cited

American Drug Index (1960), Wilson & Jones, J. B. Lippincott Co., pp. 67–68.

Merk Index, 7th ed. (1960) Merck & Co., Rahway, New Jersey, pp. 12 and 474.

ALBERT T. MEYERS, *Primary Examiner.*

JULIAN S. LEVITT, *Examiner.*

M. J. COHEN, S. J. FRIEDMAN, *Assistant Examiners.*